United States Patent [19]

Willing et al.

[11] Patent Number: 5,593,010
[45] Date of Patent: Jan. 14, 1997

[54] PROCESS AND DEVICE FOR SUPPLYING ENERGY TO WORKSTATIONS CIRCULATING ON A CHAIN

[75] Inventors: Bernd Willing, Bonn; Frank Gobel, Köln, both of Germany

[73] Assignee: Maschinenfabrik Hennecke GmbH, Leverkusen, Germany

[21] Appl. No.: 567,656

[22] Filed: Dec. 5, 1995

[30] Foreign Application Priority Data

Dec. 13, 1994 [DE] Germany ............... 44 44 280.7

[51] Int. Cl.⁶ .................................... H02G 11/00
[52] U.S. Cl. ........................... 191/12 R; 439/162
[58] Field of Search ............... 191/12 R; 137/580; 439/1, 162, 165, 31; 198/471.1, 803.5, 803.6; 138/110

[56] References Cited

U.S. PATENT DOCUMENTS

| | | | |
|---|---|---|---|
| 2,564,542 | 8/1951 | Milbourn | 191/12 R X |
| 3,517,694 | 6/1970 | Lieffring | 137/580 X |
| 3,794,151 | 2/1974 | Feasey | 198/803.5 |
| 3,851,663 | 12/1974 | Neuko | 137/580 |
| 4,700,023 | 10/1987 | Hillmann et al. | 191/12 R X |

FOREIGN PATENT DOCUMENTS

| | | | |
|---|---|---|---|
| 4309735 | 9/1994 | Germany . | |
| 1555263 | 4/1990 | U.S.S.R. | 191/12 R |

*Primary Examiner*—Karen B. Merritt
*Assistant Examiner*—Scott L. Lowe
*Attorney, Agent, or Firm*—Joseph C. Gil; Noland J. Cheung

[57] ABSTRACT

A process for the simultaneous, constantly available provision of amounts of energy and/or signal-transmission media to a plurality of workstations circulating in the shape of an oval is described. A supply line, connected to all the workstations, is circulated with workstations. Energy and/or signal-transmissions are fed through a trailing cable which is connected to a rotary linkage which is capable of travelling back and forth on a rail within the oval in the longitudinal direction of the oval and from the rotary linkage to the supply line.

2 Claims, 1 Drawing Sheet

5,593,010

PROCESS AND DEVICE FOR SUPPLYING ENERGY TO WORKSTATIONS CIRCULATING ON A CHAIN

BACKGROUND OF THE INVENTION

For carrying out a simultaneous sequence of operations at a plurality of workstations, often each individual operation is carried out at a fixed location so as to be repeated, with a plurality of workstations (driven on a belt or a chain, or each provided with its own drive) being conducted past the location where the particular operation is carried out.

The simultaneous sequence of operations may be, for example, the assembly of an appliance wherein the various stages of the assembly are carried out at various locations and the part to be assembled is located at a workstation which is moved from location to location for carrying out the various stages of the assembly. The manufacture of molded articles may be organized in similar fashion, in which case the operations of cleaning the mold, providing the mold with a release agent, inserting a displacement body, first filling of the mold, curing of the first molded article, extraction of the displacement body, second filling of the mold, curing of the second mold charge, opening of the mold and extraction of the molded article are carried out at various locations, with a mold at one workstation is conducted from one location to another.

In the case of such an implementation of the sequence of operations on the production line it is necessary in each case to supply amounts of energy and control signals at the workstations and, where appropriate, to tap measured-value signals. The energy to be supplied may be electrical energy, water for tempering, hydraulic oil, vacuum and/or compressed air. The control signals may be electrical or pneumatic control pulses which control specific functions at the workstations.

The present invention is concerned with the problem of making the various amounts of energy and/or signal-transmission media constantly available at a plurality of workstations circulating in the shape of an elongated oval.

DESCRIPTION OF THE INVENTION

Figure 1:
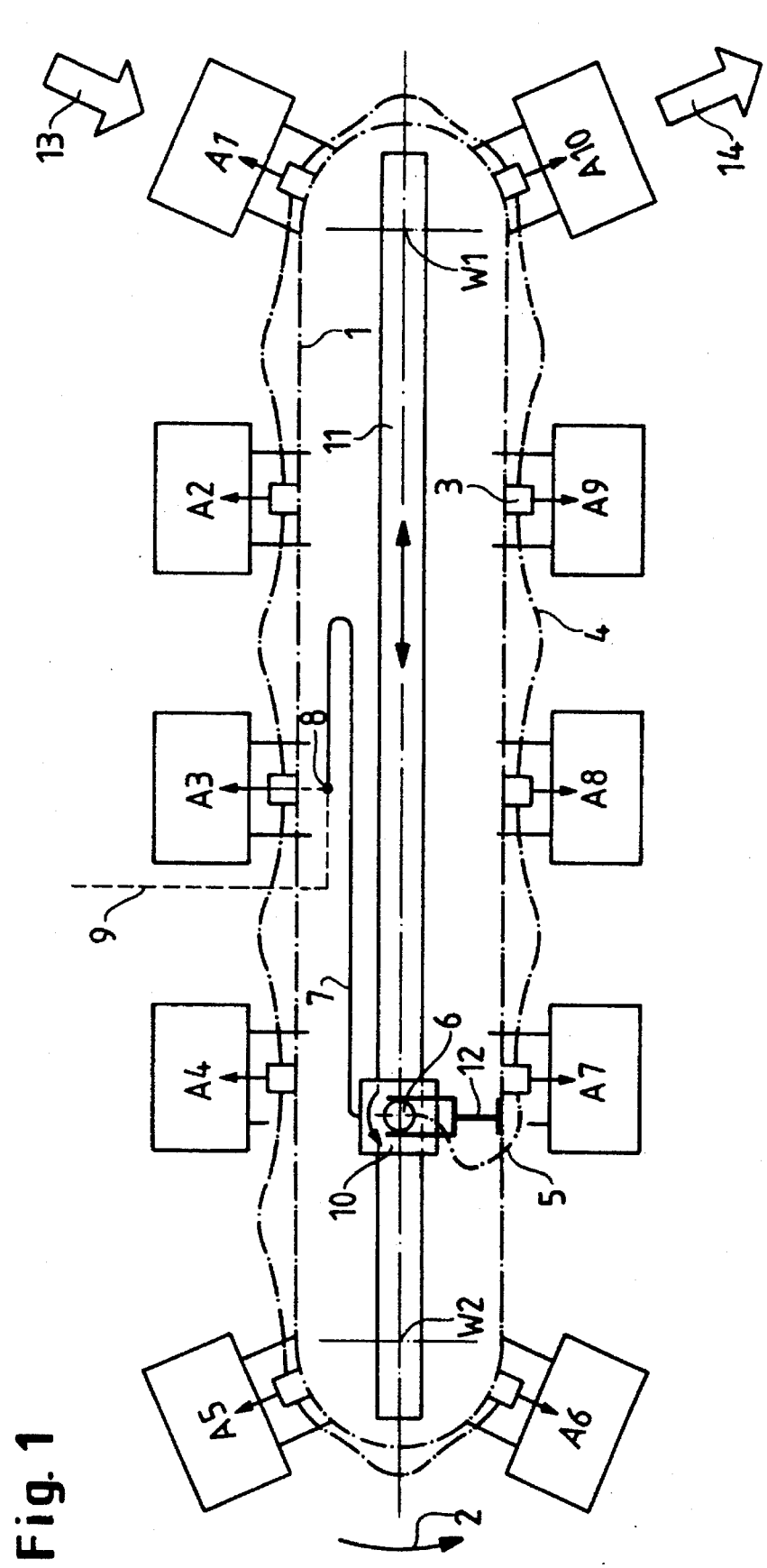
FIG. 1 shows a schematic diagram for supplying energy to workstations circulating in an oval configuration.

In accordance with the invention, energy and/or signal-transmission media are supplied via a trailing cable and a rotary linkage which is capable of travelling in the longitudinal direction of the oval to a common supply line. The common supply line circulates together with the workstations and is connected to each workstation.

The present invention provides a process for the simultaneous, constantly available provision of energy and/or signal-transmission media to workstations circulating (eg, driven on a chain) in the shape of an elongated oval. Depending on energy type and signal type, a supply line circulating together with the workstations is provided, into which the amounts of energy and/or signal-transmission media are fed concurrently at one point. The feeding is effected from a rotary linkage for the energy and/or signal-transmission media. The rotary linkage is capable of travelling back and forth on a rail within the oval in the longitudinal direction of the oval. The energy supply to the rotary linkage is effected by means of a trailing cable.

The present invention also provides a system for carrying out a repeated sequence of operations broadly comprising:

i) a plurality of workstations circulating (for example, driven on a chain) in the shape of an elongated oval, at which, at a fixed location in each case, a specific operation is carried out, ii) a supply line connected to all the workstations and circulating together with the workstations, wherein energy and/or signal-transmission media pass through said supply line to said workstations, iii) a rotary linkage arranged within the oval, iv) a connecting line from the rotary linkage to said supply line, wherein energy and/or signal transmissions pass through said connecting line to said supply line, v) a runway arranged in the longitudinal direction and within the oval with a truck capable of travelling thereon, on which the rotary linkage is secured, vi) a trailing cable connected to said rotary linkage, wherein energy and/or signal-transmissions pass through said trailing cable to said rotary linkage, and vii) an energy and/or signal-transmission means for supplying energy and/or signal transmissions to said trailing cable.

Rotary linkages for the feeding-through of various media are known as such. They consist as a rule of a stationary pipe, into which the various media are introduced through separate lines and via various peripheral lines are conducted towards the outside, axially offset, into the space between the stationary pipe and a coaxial pipe which is capable of being rotated in relation to the static pipe, the peripheral regions assigned to the various media being separated by slide seals between the two pipes. Through corresponding openings in the casing of the rotatable pipe, the particular medium can be extracted from the annular channels formed by the seals. So as to enable the rotary linkage of electrical contacts, the static pipe has electrical conducting rings on its periphery which are mutually insulated and which are tapped by slide contacts of the rotatable pipe.

In accordance with the invention the supply of energy to the supply line circulating in an oval is divided up into a movement changing in the longitudinal direction of the oval, which is enabled by the trailing cable, and a rotary movement taking place at the turn-around points of the oval, which is enabled by the rotary linkage.

The circulating movement of the workstations can be effected continuously at constant speed or in intermittent manner. In this connection both the movement of the truck on the rail and the rotary movement of the rotary linkage are controlled synchronously with the circulation of the workstations. This can be effected by means of appropriate separate, propelled drive elements or alternatively by means of a carrying fork which is firmly connected to the chain and which takes hold of the truck.

The invention is not restricted to workstations circulating in an oval. On the contrary, it can be employed to advantage also in the case of, for example, workstations circulating in the shape of a star if the rail for the truck is provided with suitable switches.

FIG. 1 shows a plurality of workstations A1 to A10 which are conducted on a chain 1 in the direction of the arrow 2 in the shape of an elongated oval. Each workstation has connecting points 3 for loads, from which energy can be drawn as indicated by the arrow. The connecting points 3 are provided with the amounts of energy and/or signal-transmission media by means of a co-circulating supply line 4, in which electrical cables, compressed air conduits, hydraulic cables, and the like are conveyed. The feeding of energy is effected via connecting line 5 to the rotary linkage 6 and the trailing cable 7. The energy supply as far as the fixed point 8 of the trailing cable 7 is effected by means of lines 9 which are permanently installed. The rotary linkage 6 is mounted on the truck 10 which is capable of travelling back and forth on the rail 11 in the longitudinal direction of the oval. In the embodiment shown the truck 10 is entrained synchronously with the movement of the workstations A1 to A10 by the carrying fork 12 which is firmly connected to the chain 1. The entrainment is effected in linear manner between the turning-points W1 and W2. When a turning-point W1 or W2 is reached, the truck 10 comes to a halt on the rail 11 and the carrying fork 12 rotates by 180° about the midpoint of the rotary linkage 6. The start and the end of the sequence of operations are indicated by the arrows 13 and 14 respectively. For example, at 13 the frame for the part to be assembled can be placed on the associated workstation and the removal of the fully assembled part is indicated by arrow 14.

The invention is not limited by the rail 11 being of strictly linear design. On the contrary, the rail may also comprise a bend if for reasons of space it is necessary to arrange the circulation of the workstations in the shape of a buckled oval.

Furthermore, it is not necessary that the chain run in the longitudinal direction of the oval parallel to the rail 11. On the contrary, necessary deviations in the spacing of the chain 1 from the rail 11 may optionally be compensated by the length of the connecting cable 5 and the length of the gripping arms of the fork 12 which are capable of embracing the car in sliding manner transversely in relation to the rail.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for simultaneously and constantly connecting a plurality of circulating workstations to a source of transmissions, the process comprising:

providing the plurality of workstations and circulating the workstations in the shape of an oval, providing a supply line, connecting the supply line to all of the plurality of workstations, and circulating the supply line along with the workstations, providing the source of transmissions and providing a rotary linkage, providing a trailing cable, connecting the trailing cable from the source of transmissions to the rotary linkage, and feeding the transmissions through the trailing cable, providing a rail within the oval which extends in a longitudinal direction of the oval, and moving the rotary linkage back and forth on the rail, and providing a connecting cable, connecting the connecting cable from the rotary linkage to the supply line, and feeding the transmissions through the connecting cable.

2. An apparatus for carrying out a repeated sequence of operations comprising:

i) a plurality of workstations circulating in the shape of an elongated oval, said workstations being capable of performing said repeated sequence of operations, ii) a supply line connected to all the workstations and circulating together with the workstations, wherein transmissions pass through said supply line to said workstations, iii) a rotary linkage arranged within the oval, iv) a connecting line connected to the rotary linkage and to the supply line, wherein said transmissions pass through said connecting line to said supply line, v) a runway arranged in a longitudinal direction of, and within, the oval, vi) a truck capable of travelling on the runway and having the rotary linkage secured thereon, vii) a trailing cable connected to said rotary linkage, wherein said transmissions pass through said trailing cable to said rotary linkage, and viii) a transmission means for supplying said transmissions to said trailing cable.

* * * * *